United States Patent

[11] 3,577,802

| [72] | Inventor | Rollin Douglas Rumsey |
| | | Buffalo, N.Y. |
| [21] | Appl. No. | 805,271 |
| [22] | Filed | Mar. 7, 1969 |
| [45] | Patented | May 4, 1971 |
| [73] | Assignee | Houdaille Industries, Inc. |
| | | Buffalo, N.Y. |

[54] LEAF SPRING TUNED VISCOUS VIBRATION DAMPER
16 Claims, 5 Drawing Figs.

| [52] | U.S. Cl. | 74/574, 188/90, 188/103 |
| [51] | Int. Cl. | F16f 15/16 |
| [50] | Field of Search | 188/90 (A5), 103; 74/574 |

[56] References Cited
UNITED STATES PATENTS
| 2,636,399 | 4/1953 | O'Connor | 74/574 |

FOREIGN PATENTS
| 999,128 | 10/1951 | France | 74/574 |
| 8,527 | 4/1913 | Great Britain | 74/574 |

Primary Examiner—George E. A. Halvosa
Attorney—Hill, Sherman, Meroni, Gross & Simpson ABSTRACT: Resilient generally axially extending spokes are anchored at radially outer ends thereof to the radially outer wall within a circular working chamber of a housing, with the radially inner ends of the spokes connected to an inertia mass flywheel for energy absorption, tuned damping of relative oscillatory vibratory motions between the flywheel and the housing. Relative vibratory oscillations are also resisted by a viscous damping medium coupling between confronting shear film spaced parallel surfaces of the housing and the inertia mass.

Patented May 4, 1971
3,577,802
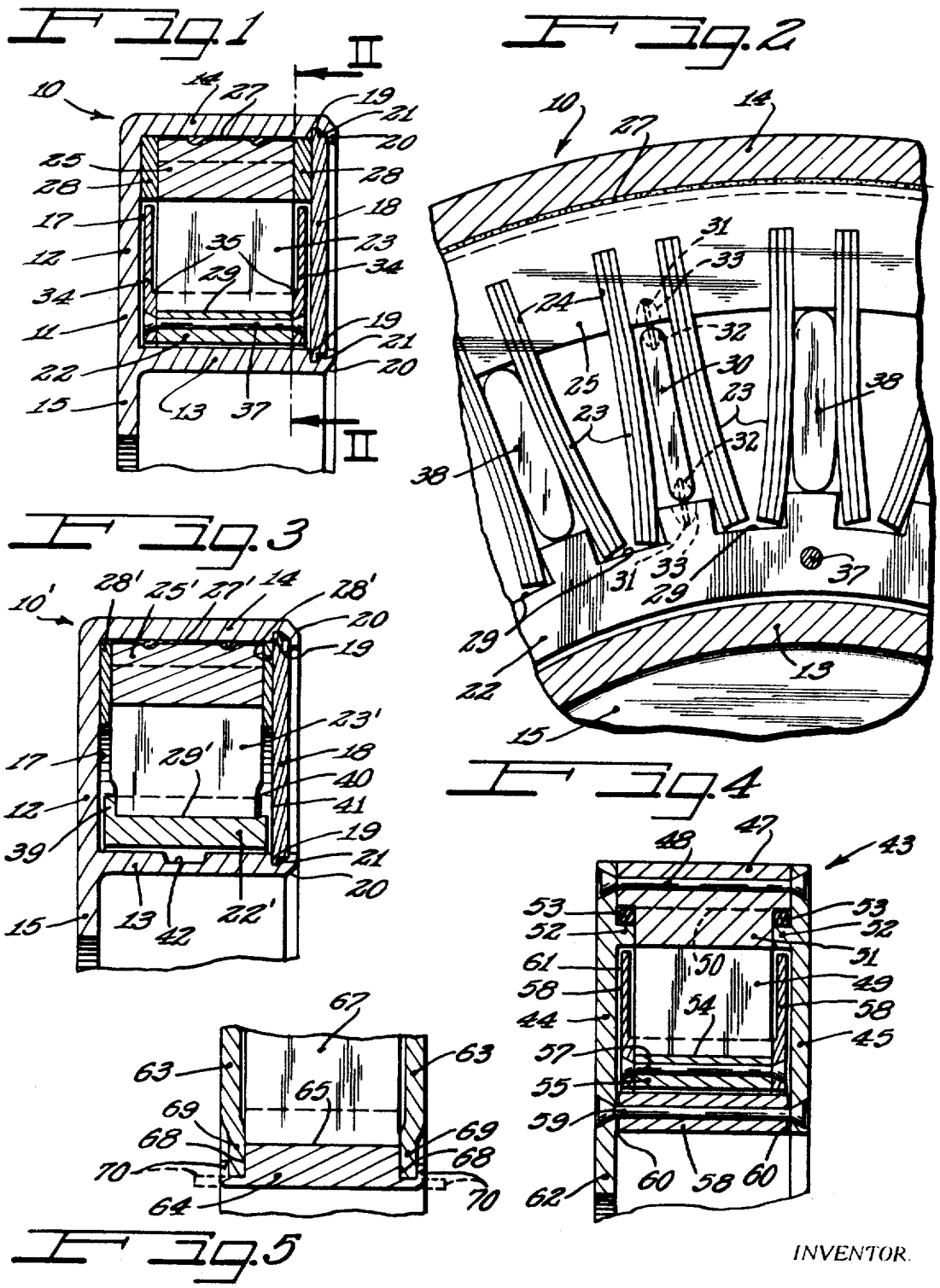
INVENTOR.
Rollin Douglas Rumsey
BY Hill, Sherman, Meroni, Gross & Simpson ATTORNEYS

LEAF SPRING TUNED VISCOUS VIBRATION DAMPER

This invention relates to torsional vibration dampers, and is more particularly concerned with novel mechanically tuned, viscous vibration dampers.

Certain problems have been present in prior tuned damper constructions and which problems are overcome by the present invention. For example, rubber springs have been employed between the inertia mass and the member subject to vibrations to be damped, but rubber suffers from short life due to high temperatures generated in the rubber, especially under severe and heavy-duty practical applications, such as in automotive diesel engine damping. The rubber also changes tuning frequency as a function of temperature, hence must be tuned at a best compromise frequency due to this variation.

In another form of prior damper a resilient quill shaft spring has been utilized to connect the inertia mass to the vibratory member to be damped, but that requires space which is often not available.

Another form of prior tuned damper has utilized a viscous damping medium with tuning effected to the housing design, such as adjustable spacing. A problem encountered with this type of damper is that, similarly as with rubber, temperature variables occur, because the viscous damping fluid changes viscosity with temperature.

A continuing need has been present for a tuned damper which will lend itself to quantitative data and practical economic engineering feasibility. One use for such a damper is in damping engine torsional amplitudes in which the tuning will break up the engine critical peak (e.g., sixth or third order) into two separate peaks, one of higher and one of lower frequency. If the lower frequency peak is made the smaller by undertuning, the higher frequency higher peak can usually be located above the engine maximum speed range. This need is met by the present invention.

It is sometimes extremely difficult to obtain a high enough frequency response of the damper in the tuning range desired. This problem is overcome by the present invention.

Accordingly, it is an important object of this invention to attain the desirable advantages of a tuned viscous vibration damper without the problems inherent in prior forms of damper.

Another object of the invention is to provide an improved form of tuned viscous damper that will have its tuning frequency unaffected by temperature, will be of extremely long life, and will be inexpensive to manufacture.

A further object of the invention is to provide a novel tuned viscous vibration damper which will, in a compact, efficient manner take advantage of both mechanical spring damping and viscous shear film damping in the same unit.

Still another object of the invention is to provide in a viscous torsional vibration damper a novel combination flywheel inertia mass and tuning spring structure.

It is also an object of the invention to provide a new and improved tuned viscous damper in which there is no internal wear since rubbing parts are eliminated whereby to attain the several advantages of avoiding deterioration of silicone damping fluid, enabling larger tolerances to be employed with resultant cost savings, enabling use of parts with less surface finishing than heretofore since bearing wear is eliminated, and avoiding any need for plating or surface coating of wear parts or use of different bearing materials to avoid seizing in the presence of silicone fluid.

Other objects, features and advantages of the present invention will be readily apparent from the following detailed description of certain preferred embodiments thereof taken in conjunction with the accompanying drawings, in which:

FIG. 1 is a fragmentary radial sectional detail view of a damper embodying features of the invention;

FIG. 2 is an enlarged sectional elevational detail view taken along the line II–II of FIG. 1 and on a larger scale;

FIG. 3 is a view similar to FIG. 1 but showing a modification;

FIG. 4 is a similar view showing another modification; and

FIG. 5 is a fragmentary sectional view showing a modified sideplate assembly with the inertia member.

Representative of a family of tuned viscous vibrations dampers embodying principles of the present invention is that identified as 10 in FIGS. 1 and 2, adapted to be mounted coaxially on a shaft liable to torsional vibrations, such as the crankshaft of an internal combustion engine, such as a diesel engine. For this purpose, the damper comprises a circular housing 11 which may be a machined casting provided with an annular axially opening channel-shaped body portion having a radial wall 12, radially spaced inner and outer axially extending coextensive walls 13 and 14, respectively, with a radially inwardly extending annular attachment flange 15 providing means for attachment of the damper to a shaft. Within the housing walls is defined an annular working chamber 17 which is closed at the opened end of the housing casing by an annular closure or cover disc 18, held in place in known manner on respective shoulders 19 by turned over respective retaining flanges 20 on the adjacent ends of the walls 13 and 14 and hermetically sealing the working chamber 17 by clamping sealing material 21 in the joint.

Within the working chamber 17 are housed inertia mass means, mechanical tuning means, and viscous damping means related in such a manner as to provide high natural frequency tuning and efficient viscous damping. Instead of locating the relatively torsionally movable inertia mass ring or flywheel within the outer diameter portion of the working chamber and housing, a torsionally relatively movable inertia mass ring 22 is, according to the present invention, located as close as practicable to the hub of the housing or inner diameter of the working chamber 17. For tuning purposes, the inertia ring 22 is connected by means of generally radially extending spokes 23 to the radially outer wall 14 of the housing.

Although shown rectangular in plan form, the spring elements 23 may be parabolic or triangular or other desirable shape. Preferably, the elements of the spring spokes 23 are in plural units, in this instance shown as two of the elements for each of the spoke units. At their radially outer ends, the spokes 23 are anchored in respective slots 24 in an anchor ring 25 which may, if preferred, be integral with the housing, but for manufacturing convenience comprises a separately formed ring of suitable material such as sintered iron, stacked steel punchings, machined casting, and the like, which is secured fixedly to the radially outer wall 14 of the housing in a suitable manner such as by epoxy bonding 27. By having the anchor ring 25 of as nearly as practicable the same width as the width of the spokes 23 and which width is less than the depth of the chamber 17, a uniform spaced relation between the axially facing surfaces of the radial housing wall 12 and the cover plate 18 is maintain by respective spacer rings 28 between the ends of the anchor ring 25 and the side edges of the spokes 23 and maintaining the spokes against axial displacement within the chamber.

Desirably the spring spokes 23 are in the form of laminated leaf springs, substantially as shown, and are relatively disposed in each pair to be maintained under preload tension toward the companion spoke of each pair by engagement of the inner end portions of the spokes within respective radially outwardly opening slots 29 in the inertia ring 22, the root width of each of these slots being predeterminedly narrower than the spacing between the land areas for the slots 24 for each pair of spokes. Thereby, the inner end portions of the resilient spokes 23 are maintained under preload tension toward one another. This preloading of the spokes 23 assures tuning, and since the springs are preloaded in opposition, there is zero backlash between the inertia ring flywheel and the housing.

To assist in maintaining a balanced relationship of the inertia ring 22 in the housing despite tolerance variables in the spoke lengths, radially extending locators 30 extend at suitable intervals, such as three equally spaced intervals, between the inertia ring 22 and the anchor ring 25. These locators are rigid members of a width to afford maximum available contact with the respective surfaces of the inertia and anchor rings along respective line contacts afforded by desirably semicylindrical end surfaces of the locators. In thickness the locators are such as to be accommodated freely between respective pairs of the resilient spokes 23 with the respective adjacent spokes bowed generally away from the locators. By virtue of their arcuate ends, the locators maintain the relative line contact with the respective surfaces of the inertia ring and the anchor ring by a rolling action in the torsional relative spring-returned reciprocations of the inertia ring relative to the housing in operation of the damper. To maintain the locators against circumferential displacement and to assist in holding the inertia ring 22 centered in the housing and substantially against drifting axially, means such as respective pins 31 are seated in circumferentially flared sockets 32 which are of a width to receive the pins in closely slidable relation and which open from opposite ends of the respective locator. From the locator sockets, the pins 31 extend into respective complementary circumferentially flared, pin-width sockets 33 aligned with the ends of the locators and opening from the respective confronting surfaces of the inertia ring 22 and the anchor ring 25 engaged by the locator.

Viscous damping within the housing 17 is effected by having confronting working surfaces on the inertia ring 22 and the housing within the working chamber spaced to provide shear films therebetween having regard to the viscosity of a damping medium in the chamber. Such viscous damping medium is desirably a silicone fluid of the desired viscosity consistent with the preferred damping factors. The greater the viscosity of the damping medium, of course, the greater may be the shear film spacing. While the radially inner perimeter of the inertia ring 22 may, as shown, be in shear film spaced relation relative to the hub wall 13, enhanced shear film spaced confrontation with the axially facing working surfaces within the housing is desirably attained by mounting on the opposite ends of the inertia ring 22 respective side extension plates 34 in the space between the edges of the spokes 23 and the adjacent housing surfaces, as maintained by the spacer washers or rings 28. Each of the plates 34 desirably comprises an annular disc having its inside diameter coincident with the inside diameter of the inertia ring 22 and of a width to extend along the edges of the spokes 23 to an outside diameter which is slightly less than and may be in shear film spaced relation to the inside diameter of the adjacent spacer ring 28. At their respective faces confronting the wall 12 and the cover plate 18, respectively, the plates 34 are in shear film spaced relation. Therefore highly effective viscous damping coupling is attained between the housing and the inertia member. To avoid interference with tuning efficiency of the spokes 28, the faces of the plates 34 confronting the edges of the spokes are spaced therefrom by offsetting the inner plate surfaces as indicated at 35.

In addition to their coupling extension function, the plates 34 serve also to maintain the flywheel member 22 against axial displacement relative to the spokes 23 by locking the inner end portions of the spokes in the slots 29. Attachment of the plates 34 to the inertia ring may be effected in any suitable manner, such as by means of rivets 37. Since the principal functions of the plates 34 are as locking means and as shear film surface extensions of the flywheel ring, they may be economically made as stampings from suitable material such as aluminum, although a rigid plastic material compatible with the silicone fluid may be utilized. Where it is desired that the plates 34 provide additional weight for the flywheel, they may, of course, be made of a heavier material.

Adequate circulation of the viscous damping medium is attained by and through the spaces between spokes and the spaces between the spacers 28 and the adjacent edges of the plates 34. If it is desired to reduce the volume of damping medium within the damper suitable fillers 38 may be disposed between at least some of the groups of the spokes 23. These fillers 38 may be in the form of hermetically sealed elastomeric cells which will yield conformably to motion of the contiguous spokes 23 and also serve as resiliently yieldable takeup devices for heat expansion of the viscous damping medium. On the other hand, if preferred, the fillers may be made from more rigid material such as Pyrex glass, or the like.

In the modification of FIG. 3, a damper unit 10' is depicted which is in general respects similar to the damper 10 of FIG. 1, and the housing structure is substantially the same, wherefore identical reference numerals have been applied thereto. In the damper 10', the inertia ring 22' is wider than in FIG. 1, as are also the spokes 23' and the anchor ring 25' which is bonded as by means of epoxy 27' to the housing wall 14. In this form, also, the spacers 34' are thinner, consistent with the greater width of the other associated internal damper components.

At its respective opposite ends, the inertia ring member 22' provides working surfaces which are in parallel shear film spaced relation directly with the confronting axially facing housing surfaces as well as with the hub wall 13. To hold the inertia ring 22' against axial displacement relative to the spokes 23', means are provided across the opposite ends of the grooves 29' to lock the inner end portions of the spokes therein comprising, for example, a solid locking land 39 comprising an integral part of the inertia ring at one end of each groove and a snap-in split retaining ring 40, engaged in a locking ring groove 41, across the opposite ends of the spoke-receiving grooves. If desired, a viscous damping medium reservoir groove 42 may be provided in the surface of the wall 13 within the working chamber 17.

In FIG. 4 is disclosed a damper unit 43 which functions much the same as the damper 10 of FIG. 1 but has a different housing construction. Opposite sideplates 44 and 45 have an outer annular wall member 47 secured therebetween as by means of rivets 48 and serving also as an anchor ring for leaf spring tuning spokes 49 which have their radially outer end portions engaged in slots 50 provided in a spoke-anchoring portion 51 symmetrically inset along the inner perimeter portion of the combination wall and anchoring ring member whereby to accommodate respective annular inwardly projecting ribs 52 on the wall plates 44 and 45 serving as retainers against axial displacement of the spokes from the slots 50 and also defining annular sealing pockets within which are engaged respective sealing rings 53.

At their radially inner end portions, the spokes 49 are, similarly as in the damper 10 of FIG. 1, engaged with grooves 54 of an inertia, flywheel ring member 55 to the opposite ends of which are secured as by means of rivets 57 respective combination damping surface extension and spoke-retaining discs 58. While the discs 58 afford primary working surfaces on the flywheel 55 in shear film spaced relation to confronting surfaces of the housing plates 44 and 45, the inner diameter of the inertia member 55 provides a shear film working surface confronting the inner cylindrical surface of a radially inner or hub wall ring 58 which is secured to and between the sidewall plates 44 and 45 as by means of rivets 59 with suitable sealing means such as epoxy cement 60 in the joints between the member 58 and the plates. Suitable viscous damping material such as a silicone fluid is loaded to the extent desired in a working chamber space 61 hermetically sealed within the housing. For attaching the damper 43 to a member such as a shaft subject to vibrations that should be damped, one of the sideplates, herein the sideplate 44, has a radially inner attachment flange portion 62.

In FIG. 5 is shown a modified means for attaching combination shear film working surface extension and spoke-retaining discs 63 to a flywheel inertia ring 64 which has slots 65 within which the inner ends of leaf spring spokes 67 are received. In this instance, the respective opposite end portions of the inertia ring 64 are provided with rabbets 68 within which inset annular inner marginal portions 69 of the discs 63 are mounted in spoke-locking relation to the respective opposite ends of the grooves 65. Bendable locking flanges 70 are turned into locking engagement with the inset margins 69 to clamp the plate margins permanently in assembly. The arrangement shown in FIG. 5 may be utilized in either of the form of dampers of FIGS. 1 and 4.

In all forms of the damper suitable preferred low-cost materials may be used. Effective avoidance of metal-to-metal rubbing of parts, and especially ferrous parts, is accomplished in respect to the shear film working surfaces, as is highly desirable in respect to the silicone fluid generally employed in this form of damper. Further, the arrangements disclosed wherein the inertia ring mass is at the radially inner ends of the spokes, rather than at the radially outer ends of the spokes, allows a considerably higher tuning frequency which is proportional to the square root of the spring rate over inertia mass.

It will be understood that variations and modifications may be effected without departing from the spirit and scope of the novel concepts of this invention.

I claim:

1. A tuned torsional viscous vibration damper comprising:
   housing means providing a circular working chamber provided with an annular spoke-anchoring structure at its radially outer diameter and facing radially inwardly;
   generally radially extending resilient turning spokes having radially outer end portions thereof fixedly connected to said anchoring structure;
   an inertia mass torsionally movably related to said housing within said working chamber and having an annular radially outer perimeter spaced radially inwardly from said anchoring structure with radially inner end portions of said spokes connected thereto; and
   viscous damping medium in said chamber;
   said inertia mass and said housing having confronting parallel surfaces in shear film spaced relation having regard to the viscosity of said viscous damping medium whereby to provide viscous damping coupling between the inertia mass and the housing.

2. A damper according to claim 1, said housing means comprising a pair of spaced sideplates, respective radially inner and radially outer walls comprising spacing ring, means securing said rings in radially spaced concentric relation to and between said plates, said radially outer wall ring having said spoke-anchoring structure provided with inwardly opening slots, said spokes comprising leaf springs having their radially outer ends engaged in said slots, said inertia mass comprising a ring member in spaced adjacency to said inner spacing wall ring and provided with slots opening into the working chamber defined between said plates and said wall rings, and the inner end portions of the spokes being received in the slots in the inertia ring.

3. A damper according to claim 1, including filler means between at least some of said spokes to reduce the volumetric area within said chamber.

4. A damper according to claim 1, said spokes comprising leaf springs disposed by cooperative pairs maintained under preload tension toward one another, thereby assuring zero backlash between the inertia member and the housing.

5. A damper according to claim 1, in which said spokes are laminated leaf springs.

6. A damper according to claim 1, said housing means comprising a radially inner and a radially outer wall whereby said working chamber is annular, said radially outer wall having said spoke-anchoring structure thereon within said chamber having slots therein, said spokes comprising leaf springs having their radially outer ends in said slots, said inertia mass comprising a ring member having its inner perimeter adjacent to said radially inner wall and having transverse slots in its outer perimeter within which the inner end portions of said spokes are engaged.

7. A damper according to claim 6, including rigid roc mounted locators between and in engagement with said inertia ring member and said spoke-anchoring structure.

8. A damper according to claim 1, said housing means having a circular radially outer wall, and said spoke-anchoring structure for the radially outer end portions of said spokes comprising a ring-shaped member assembled in said chamber and secured to said wall.

9. A damper according to claim 8, said housing means having radially extending sidewalls along said chamber, said ring-shaped anchoring member having slots therein on its inner perimeter, said spokes comprising leaf springs with their radially outer end portions mounted in said slots, said anchoring member and said spokes being narrower than the space between said sidewalls, and spacer means between the ends of said anchoring member and said sidewalls retaining said spokes against displacement in axial direction from said slots and with their side edges spaced from said sidewalls.

10. A damper according to claim 9, said inertia mass having extensions into the space between said sidewalls and said spoke side edges and provided with working surfaces opposing said sidewalls in shear film spaced relation.

11. A damper according to claim 1, said spokes comprising resilient leaf springs, said spoke-anchoring structure having radially inwardly opening axially extending slots within which the radially outer end portions of the spokes are engaged.

12. A damper according to claim 11, including means retaining said spokes against axial displacement relative to said slots and maintaining opposite side edges of the spokes in spaced relation to confronting surfaces of the housing means within said chamber.

13. A damper according to claim 11, having damping surface extension discs attached to said inertia mass and interposed between edges of the spokes and said confronting housing surfaces in the chamber and having working surfaces in shear film spaced relation to said confronting surfaces.

14. A damper according to claim 13, rivets securing said discs to the inertia mass.

15. A damper according to claim 13, said inertia mass having slots therein within which the radially inner end portions of the spokes are engaged, and said discs having radially inner marginal portions fixedly secured to said inertia mass and retaining the inertia mass against axial displacement relative to said spokes.

16. A damper according to claim 13, said discs comprising lightweight metal and of a diameter to extend at outer peripheries thereof adjacent to said means on said housing having said inwardly opening slots.